(12) United States Patent
Shibayama et al.

(10) Patent No.: US 6,189,686 B1
(45) Date of Patent: Feb. 20, 2001

(54) SLAT CONVEYOR CHAIN

(75) Inventors: Katsutoshi Shibayama, Higashiosaka; Yoshihiro Murakami, Yao, both of (JP)

(73) Assignee: Tsubakimoto Chain Co., Osaka (JP)

( * ) Notice: Under 35 U.S.C. 154(b), the term of this patent shall be extended for 0 days.

(21) Appl. No.: 09/363,428

(22) Filed: Jul. 29, 1999

(30) Foreign Application Priority Data

Jul. 29, 1998 (JP) .................................. 10-214583

(51) Int. Cl.$^7$ ................................................ B65E 17/38
(52) U.S. Cl. ........................... 198/853; 198/850; 198/493
(58) Field of Search .................................. 198/493, 495, 198/851, 852, 853, 850

(56) References Cited

U.S. PATENT DOCUMENTS

| | | | | |
|---|---|---|---|---|
| 1,883,528 | * | 10/1932 | Buck ..................................... | 198/853 |
| 5,213,203 | * | 5/1993 | Kinney et al. ........................ | 198/850 |
| 5,253,744 | * | 10/1993 | Ensch ................................. | 198/853 X |
| 5,335,768 | * | 8/1994 | Schladweiler ......................... | 198/853 |

FOREIGN PATENT DOCUMENTS 9-315540   12/1997   (JP) .

* cited by examiner

*Primary Examiner*—James R. Bidwell
(74) *Attorney, Agent, or Firm*—Dann, Dorfman, Herrell and Skillman, P.C.; Henry H. Skillman

(57) ABSTRACT

Slats of a slat conveyor chain each have a multiplicity of drain holes distributed in a desired pattern, and discharge grooves formed in the underside of each slat along sliding surface portions facing guide rails of the slat conveyor chain. A treatment liquid, such as lubricating liquid or washing liquid, supplied onto a load-bearing upper surface of the slat conveyor chain for stable and damage-free conveyance of articles such as PET bottles, cans and so on is smoothly discharged from the discharge grooves through the drain holes without scatting around a frame of the slat conveyor chain. With this discharging of the treatment liquid, bearings and a speed reducer of a chain drive mechanism are protected against corrosion. The slat conveyor chain can, therefore, operate reliably over a long period of use while keeping the surrounding environment against contamination with the treatment liquid.

7 Claims, 8 Drawing Sheets

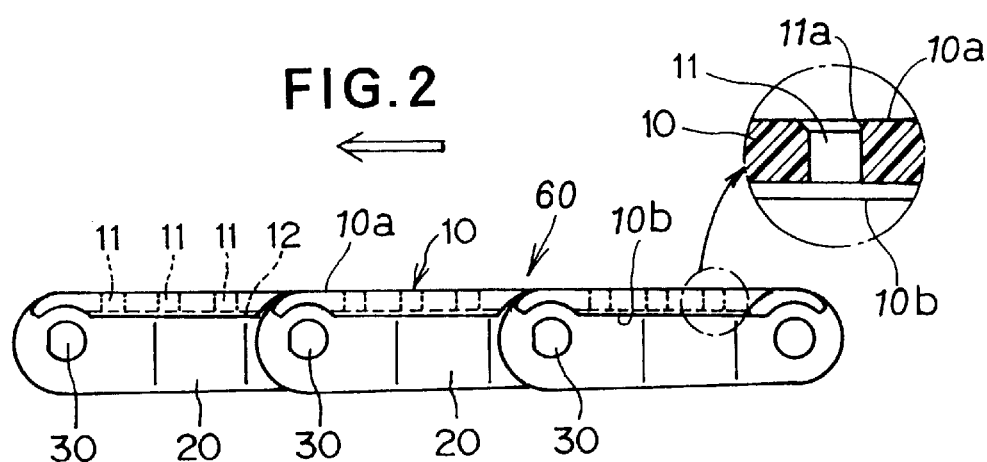
FIG.2
FIG.2A
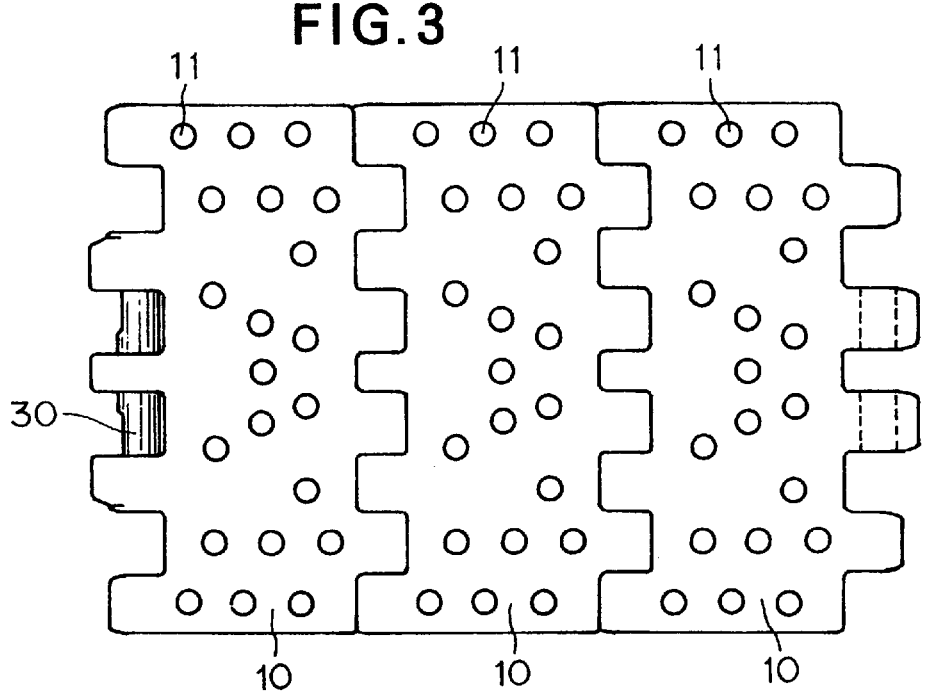
FIG.3
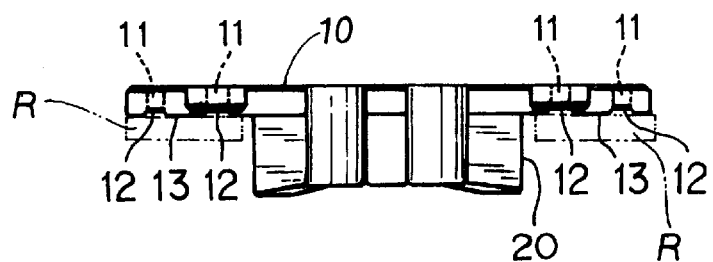
FIG.4

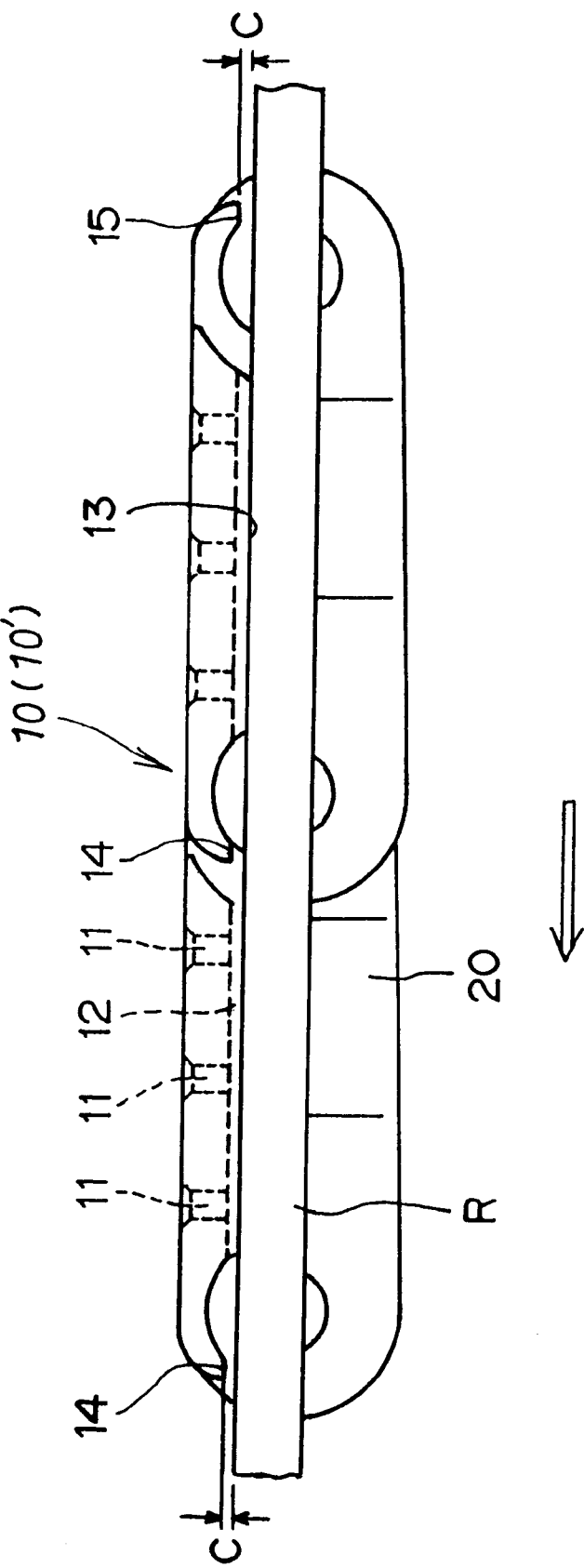

SLAT CONVEYOR CHAIN

BACKGROUND OF THE INVENTION

1. Field of the Invention

The present invention relates generally to a slat conveyor chain for conveying articles while a treatment liquid such as soap-and-water solution is supplied onto the load-bearing upper surface of the slat conveyor chain. More particularly, this invention relates to such a slat conveyor chain which is particularly suitable for conveyance of PET (polyethylene terephthalate) bottles, cans or the like containers for medicines and beverages.

2. Description of the Related Art

Conventionally, a slat conveyor chain formed from synthetic resin is used for conveyance of PET bottles, cans or the like containers for medicines and beverages.

As shown in FIGS. 8A and 8B, the conventional synthetic resin slat conveyor chain includes a series of slats 1 and chain links 2 formed integrally with respective undersides of the slats 1 and articulated by pins 3 at their reinforcement ribs to form an endless chain. The slats 1 are made from an engineering plastics such as polyacetal resin. The pins 3 are formed from stainless steel or engineering plastics.

When used in various production lines, the conventional slot conveyor chain is looped around a pair of horizontally spaced drive and driven sprockets S1, S2 and is driven by the drive sprocket 1 to transport articles W such as beverage containers carried on respective load-bearing upper surfaces of the slats 1 while respective undersides of the slats 1 are stably guided by a pair of laterally spaced guide rails R, R (FIG. 9) located on opposite sides of the links 3.

To protect the beverage containers W against an abrasive mark or scar during conveyance on the load-bearing upper surfaces of the slats 1, and to secure stable conveyance of the containers W with minimum abrasive wear of the chain, a soap-and-water solution is showered from a nozzle N onto the load-bearing upper surfaces of the slats 1 to lower the friction coefficient of the load-bearing upper surfaces and to lubricate the chain. The nozzle N is disposed above the slat conveyor chain at a position near the driven sprocket S2, as shown in FIG. 10.

The PET bottles, for which demand has increased in recent years, are relatively soft. Accordingly, when many such relatively soft PET bottles are accumulated on the synthetic resin slat conveyor chain during conveyance, the accumulated PET bottles are likely to deformed or otherwise damaged due to a large line pressure (conveyance resistance) resulting from an increased frictional resistance produced between the load-bearing upper surfaces of the slats 1 and bottom surfaces of the PET bottles.

Especially for those PET bottles having a bottom wall of petaloid shape, stable conveyance is almost impossible because the PET bottles are likely to come down or fall during conveyance due to their very unstable petaloid-shaped bottom walls. To deal with this problem, the amount of soap-and-water solution showered onto to the load-bearing upper surfaces of the slats is increased to a level greater than as used for conveyance of beverage cans. However, due to the increased supply of soap-and-water solution, the slat conveyor chain becomes excessively wet and the soap-and-water solution stays on part of the slat conveyor without draining. Excessive soap-and-water solution, which may stay on the load-bearing upper surfaces of the slats or between the undersides of the slats and the guide rails, scatters around a conveyor frame and thus causes contamination of working environment around the conveyor frame. Additionally, the scattered soap-and-water solution may cause corrosion of bearings fitted around drive and drive shafts of a chain drive mechanism and corrosion of a speed reducer of the chain drive unit, resulting in considerable shortening of the service life of the chain drive mechanism. These problems also occur when the articles to be conveyed are bins or when vast amounts of washing liquid are used for washing articles while being conveyed.

SUMMARY OF THE INVENTION

With the foregoing problems in view, it is an object of the present invention to provide a slat chain conveyor which can smoothly discharge an excess amount of treatment liquid, such as lubricating liquid or washing liquid, from an upper surface to the underside of each slat to secure smooth and stable conveyance of articles while keeping the surrounding working environment against contamination with the treatment liquid and also preventing reduction of service life of a chain drive unit due to corrosion of parts with the treatment liquid.

To attain the foregoing object, the present invention provides a slat conveyor chain for a slat conveyor including a sprocket for driving the slat conveyor chain to travel in a direction along a guide rail of the slat conveyor for conveyance of articles while a treatment liquid is supplied onto an upper surface of the slat conveyor chain. The slat conveyor chain comprises: a series of slats each having a multiplicity of drain holes extending from an upper surface to an underside of each slat for the passage therethrough of the treatment liquid, the drain holes being distributed in a desired pattern; and a series of links formed integrally with the respective undersides of the slats and articulately connected together by pins to form a flexible endless chain driven by the sprocket. The underside of the slats each have a sliding surface portion facing the guide rail, and at least one discharge groove formed in the sliding surface portion and connected to at least one of the drain holes. The treatment liquid supplied onto the upper surface of the slat conveyor chain for smooth and damage-free conveyance of the articles is smoothly discharged from the discharging groove through said at least one drain hole without scatting around a frame of the slat conveyor. With this discharging of the treatment liquid, bearings and a speed reducer of a chain drive mechanism are protected against corrosion. The slat conveyor chain can, therefore, operate smoothly over a long period of use while keeping the surrounding working environment against contamination with the treatment liquid.

Preferably, the drain holes each have a flared end opening at the upper surface of each slat, so that the excessive treatment liquid is smoothly introduced into the drain holes.

The discharge groove may extend in a direction parallel to the direction of travel of the slat conveyor chain. In this instance, the pattern of the drain holes is preferably such that a plurality of drain holes arranged in a row in a direction parallel to the direction of travel of the slat conveyor chain are all connected to the discharge groove.

As an alternative, the discharge groove may extend obliquely from the vicinity of an outer side edge of each slat to the associated link in a direction opposite to the direction of travel of the slat conveyor chain. The obliquely extending discharge groove is particularly suitable when the treatment liquid is a lubricating liquid because a pin-joint portion between two adjacent links can be lubricated with the lubricating liquid. The pattern of the drain holes is preferably such that a plurality of drain holes arranged in a row oblique to the direction of travel of the slat conveyor chain are all connected to the discharge groove.

Preferably, the sliding surface portion of each slat is partly spaced by a distance from the guide rail at a leading end portion and a trailing end portion of each slat. This arrangement achieves smooth delivery of the treatment liquid from the discharge groove in one slat to the discharge groove in a subsequent slat without causing spouting of the treatment liquid over the upper surface of the slat conveyor chain through a joint clearance between the adjacent slats. The distance between the sliding surface portion and the guide rail is preferably at lest equal to a depth of the discharge groove. Preferably, the leading end portion and the trailing end portion are complemental in shape, and the trailing end portion of the one slat is interdigitated with the leading end portion of the subsequent slat.

The above and other objects, features and advantages of the present invention will become apparent to those versed in the art upon making reference to the following detailed description and the accompanying sheets of drawings in which certain preferred structural embodiments incorporating the principle of the present invention are shown by way of illustrative examples.

BRIEF DESCRIPTION OF THE DRAWINGS

FIG. 2 is a front elevational view showing part of the slat conveyor chain according to the present invention;

FIG. 2A is an enlarged cross-sectional view of a portion of FIG. 2;

FIG. 3 is a plan view of FIG. 2;

FIG. 4 is a right side view of FIG. 2;

FIG. 7 is a fragmentary front elevational view of a slat conveyor chain according to a modification of the present invention;

DETAILED DESCRIPTION OF THE PREFERRED EMBODIMENTS

Figure 1:
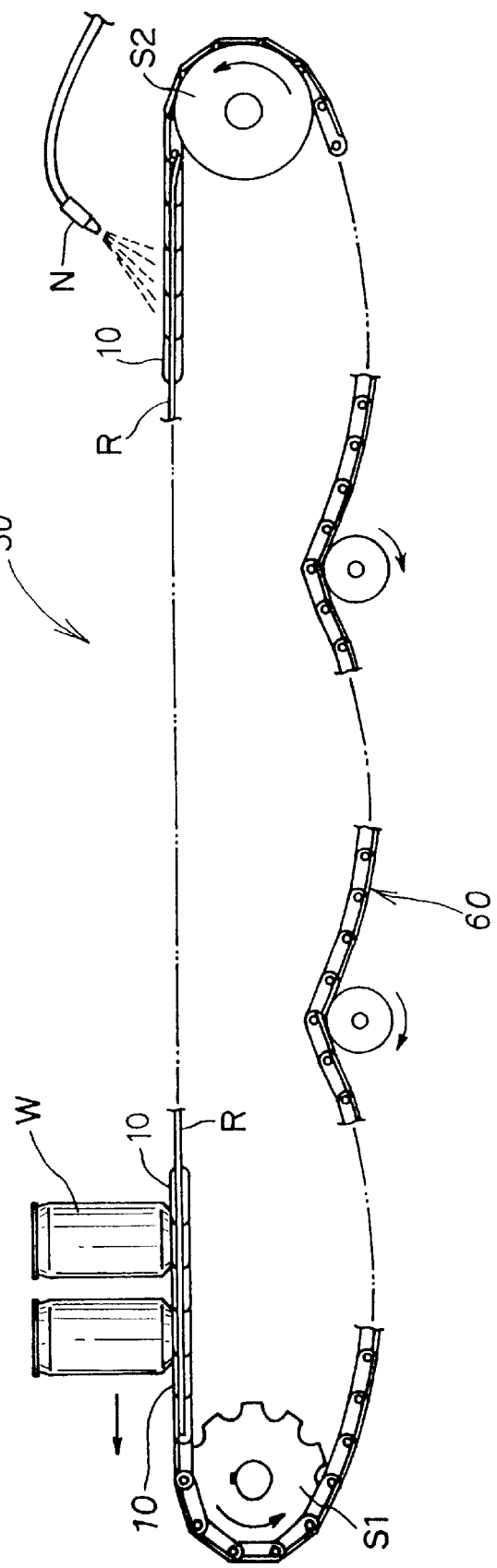
FIG. 1 is a diagrammatical view showing the general arrangement of a slat conveyor in which a slat conveyor chain according to the present invention is incorporated for conveyance of cans while a lubricating liquid is showered onto a load-bearing upper surface of the slat conveyor chain.

Certain preferred structural embodiments of the present invention will be described in greater detail with reference to the accompanying drawings, wherein like reference characters designate like or corresponding parts throughout the several views.

FIG. 1 shows the general arrangement of a slat conveyor 50 used for conveyance of beverage cans W. The slat conveyor 50 includes a slat conveyor chain 60 according to the present invention. The slat conveyor chain 60 is an endless chain looped around a pair of horizontally spaced driven and driven sprockets S1 and S2. By the drive sprocket S1 the slat conveyor chain 60 is driven to travel in a direction indicated by the arrow while an upper run of the slat conveyor chain 60 is guided on and along a pair of parallel spaced horizontal rails R extending between the drive and driven sprockets S1, S2. The lower free run of the slat conveyor chain 60 is guided by a plurality of guide rollers (not designated). For smooth and damage-free conveyance of the cans W, a lubricating liquid such as soap-and-water solution is showered from a nozzle N onto the upper surface of the slat conveyor chain 60. The nozzle N is disposed above the slat conveyor chain 60 at a position located near the driven sprocket S2.

As shown in FIGS. 2–5, the slat conveyor chain 60 is comprised of a series of slats 10, and a series of links 20 each formed integrally with the underside of one of the slats 10 at a central portion of each slat 10. The slat 10 and the link 20 in each pair are integrally molded of synthetic resin such as polyacetal resin. The adjacent links 20 are articulately connected by pins 30 (FIGS. 2 and 5) and thus form a flexible endless slat conveyor chain 60. The slat conveyor chain 60 can be used in a production line for achieving various processing operations, such as processing, washing, sorting, inspection and so on, while the articles are transported on the slat conveyor chain 60.

The slats 10, links 20 and pins 30 may be formed from engineering plastic materials including polyamide, polybutylene terephthalate, polyacetal, polypropylene and polyethylene. As a material for the slats 10 and links 10, polyacetal resins are preferable because they have low friction coefficient, high wear resistance and high electric conductivity. In the case where high chemical resistance, high heat resistance and high-speed traveling of the slat conveyor chain are major requirements, super engineering plastics are preferable as a material for the slats 10 and links 20.

The slats 10 each have a multiplicity of drain holes 11 extending from an upper surface 10a to the underside 10b of each slat 10. As shown in FIG. 2A, one end 11a of each drain hole 11, which opens at the upper surface 10a of the slat 10, is countersunk or flared to guide the lubricating liquid smoothly into the drain hole 11. The drain holes 11 are distributed in a desired pattern substantially over the entire area of the slat 10, as shown in FIG. 3. The upper surfaces 10a of the slats 10 form the load-bearing upper surface of the slat conveyor chain 60 on which the beverage cans (articles) W are carried.

The underside 10b of each slat 10 has a pair of laterally spaced sliding surface portions 13 disposed on opposite sides of the link 20 and facing the guide rails R, R of the slat conveyor, respectively, as shown in FIG. 4. Each of the sliding surface portions 13 has a plurality (two in the illustrated embodiment) of discharge grooves 12 extending linearly from a leading end (left end in FIG. 5) to a trailing end (right end in FIG. 5) of the slat 10 in a direction parallel to the direction of chain travel indicated by the profiled arrow shown in FIG. 5. Each of the discharge grooves 12 is connected to a plurality (three in the illustrated embodiment) of drain holes 11 arranged in a row extending in a direction parallel to the direction of chain travel. Thus, the lubricating liquid supplied onto the upper surface 10a of the slat 10 is discharged to the discharge grooves 12 through the drain holes 11. Since the discharged grooves 12 are arranged parallel to the direction of chain travel, the lubricating liquid is discharged in a direction opposite to the direction of chain travel without scattering around a frame of the slat conveyor 50 (FIG. 1).

As described above, the lubricating liquid (soap-and-water solution) is supplied from the nozzle N (FIG. 1) onto the upper surface of the slat conveyor chain 60 during operation of the slat conveyor 50 (FIG. 1). An excess amount of lubricating liquid, which would otherwise tend to stay on the upper surfaces 10a of the slats 10, is smoothly introduced into the drain holes 11 via the flared ends 11a, then discharged from the discharge grooves 12 in a direction opposite to the direction of chain travel. Since the excessive lubricating liquid is removed from the load-bearing upper surfaces 10a of the slats 10 without scattering around the conveyor frame, the working environment around the slat conveyor 50 (FIG. 1) is kept free from contamination with the lubricating liquid. Additionally, since the lubricating liquid does not cause corrosion of bearings (not shown) of a chain drive mechanism including the sprockets S1, S2, nor does it enter a speed reducer (not shown) of the chain drive mechanism, the chain drive mechanism has a long service life and can operate reliably throughout such long service life.

Figure 5:
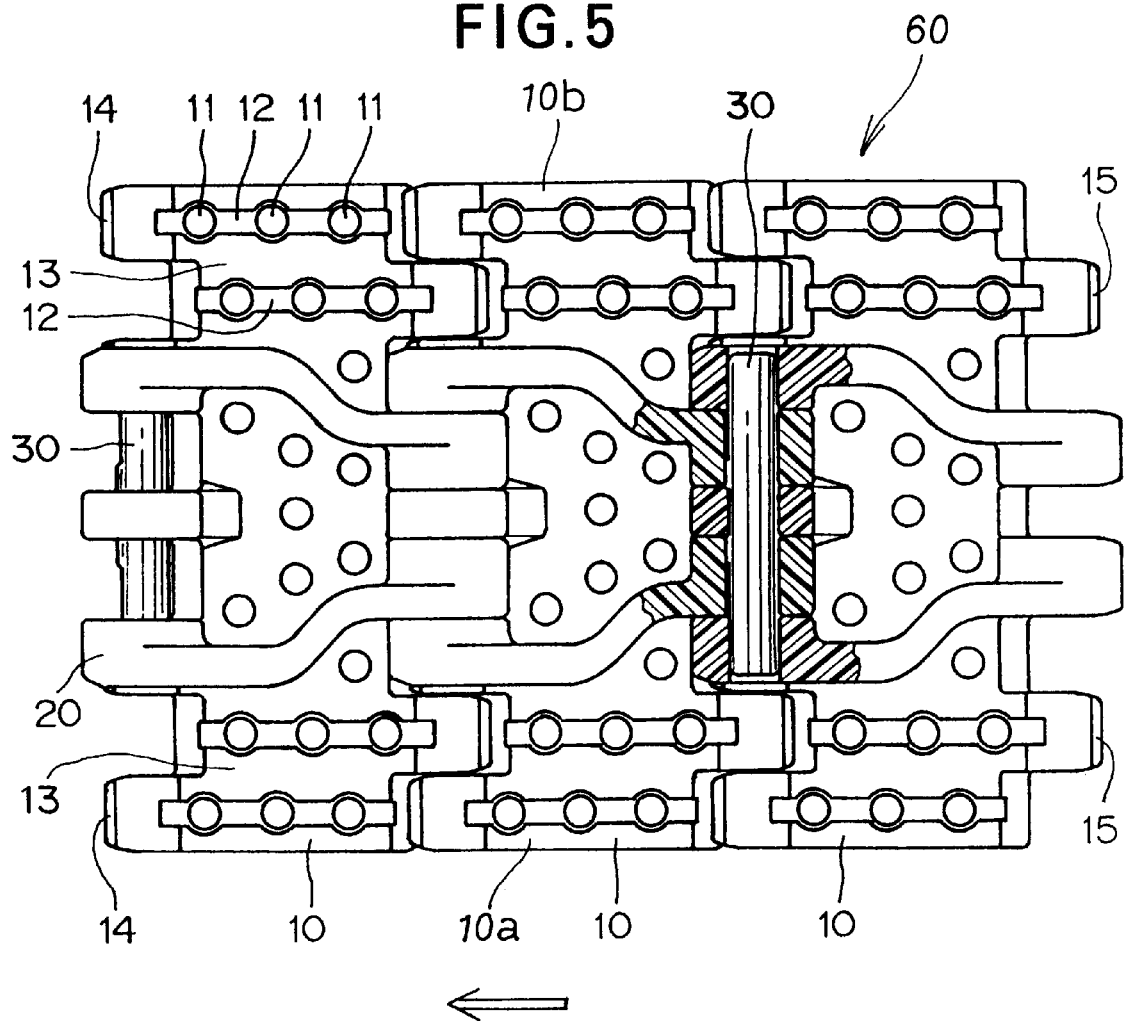
FIG. 5 is a bottom view of FIG. 2.
Figure 6:
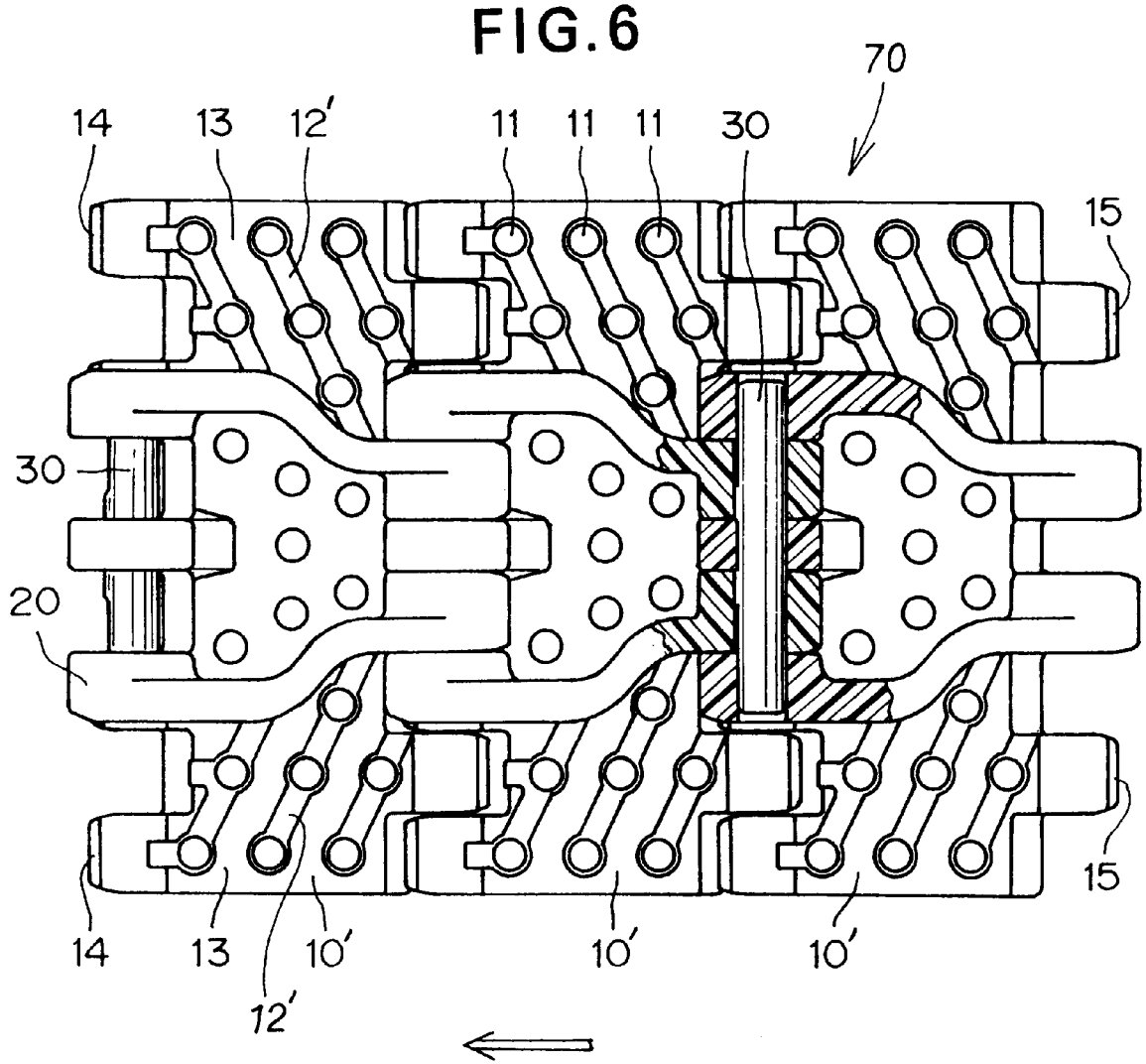
FIG. 6 is a view similar to FIG. 5, but showing the underside of a slat conveyor chain according to a second embodiment of the present invention.
Figure 8A:
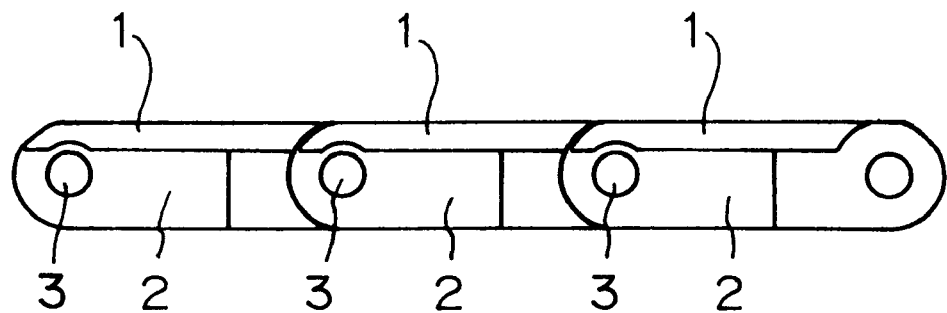
FIG. 8A is a fragmentary front elevational view of a conventional slat conveyor chain.
Figure 8B:
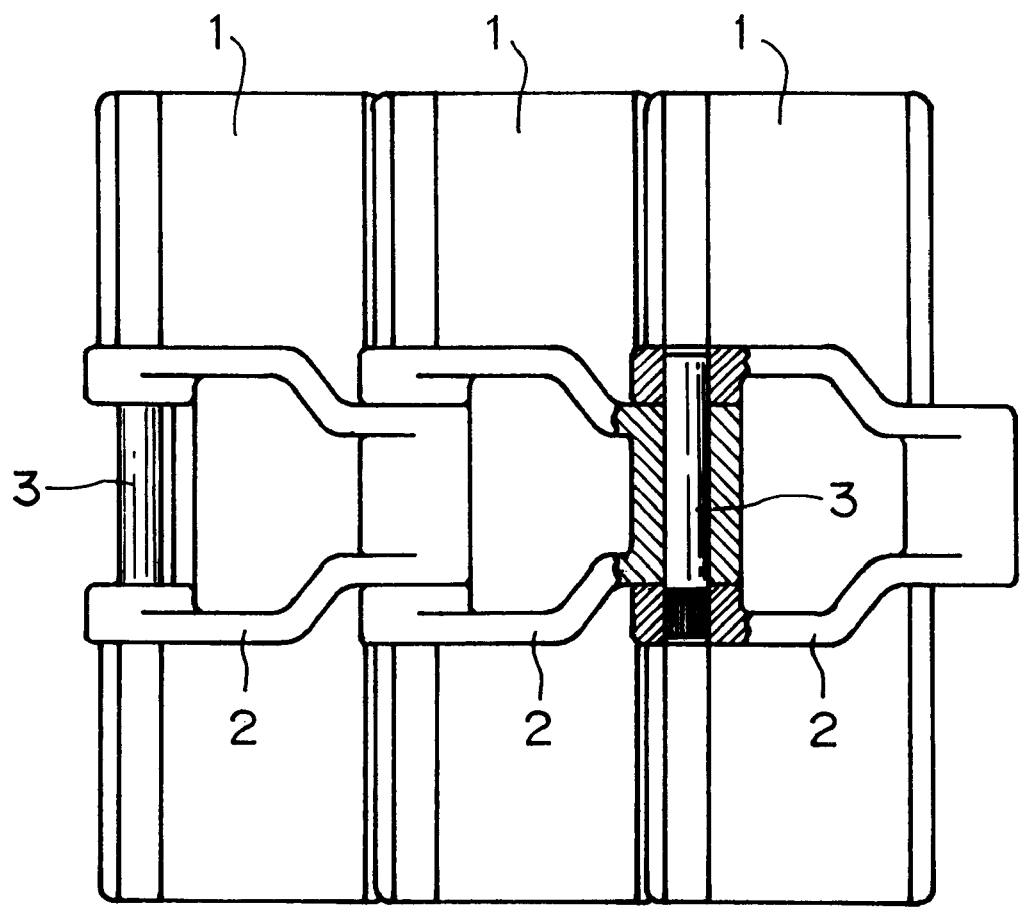
FIG. 8B is a bottom view of FIG. 8A.
Figure 9:
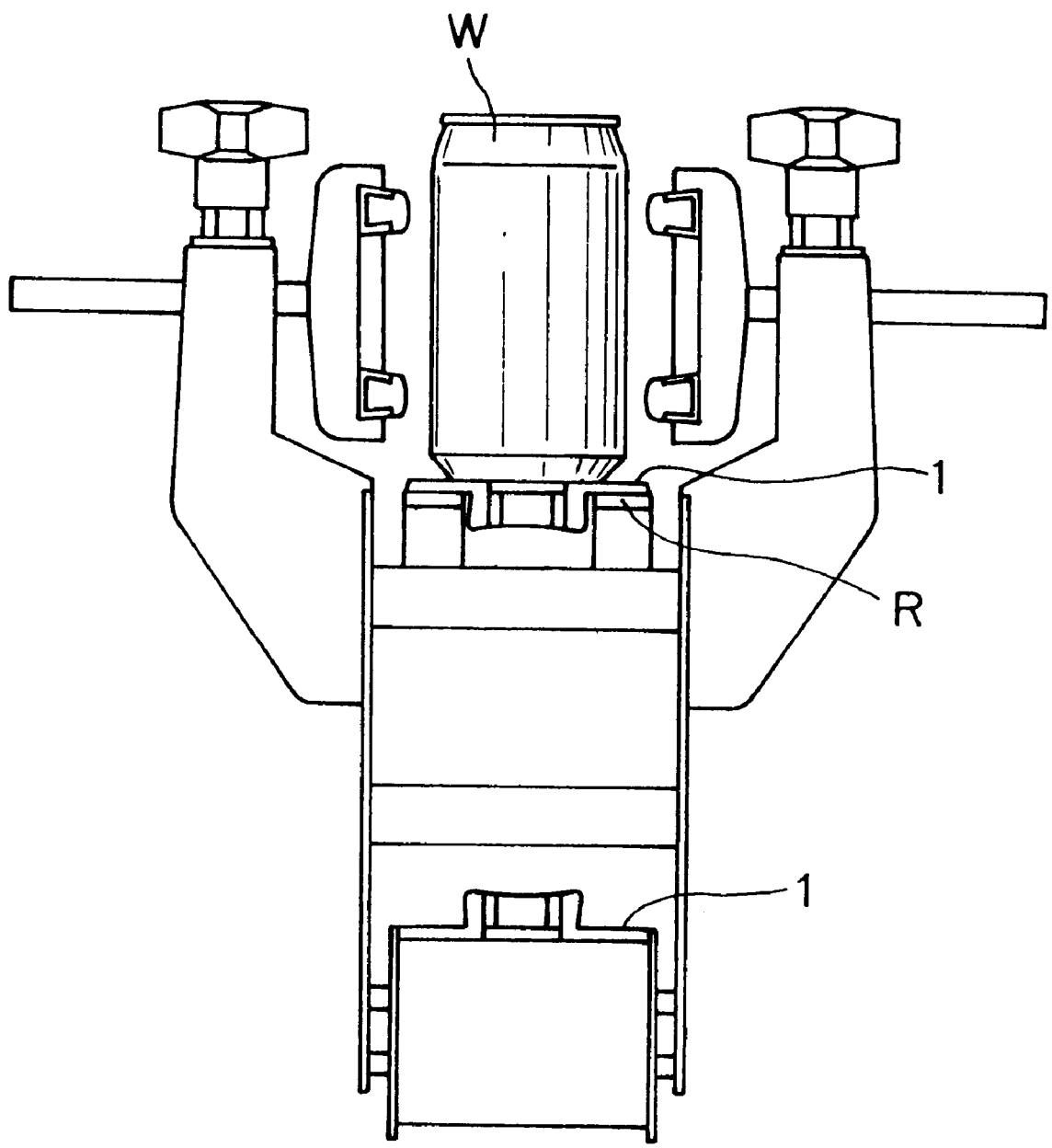
FIG. 9 is a diagrammatical view showing the conventional slat conveyor chain as it is used for conveyance of cans.
Figure 10:
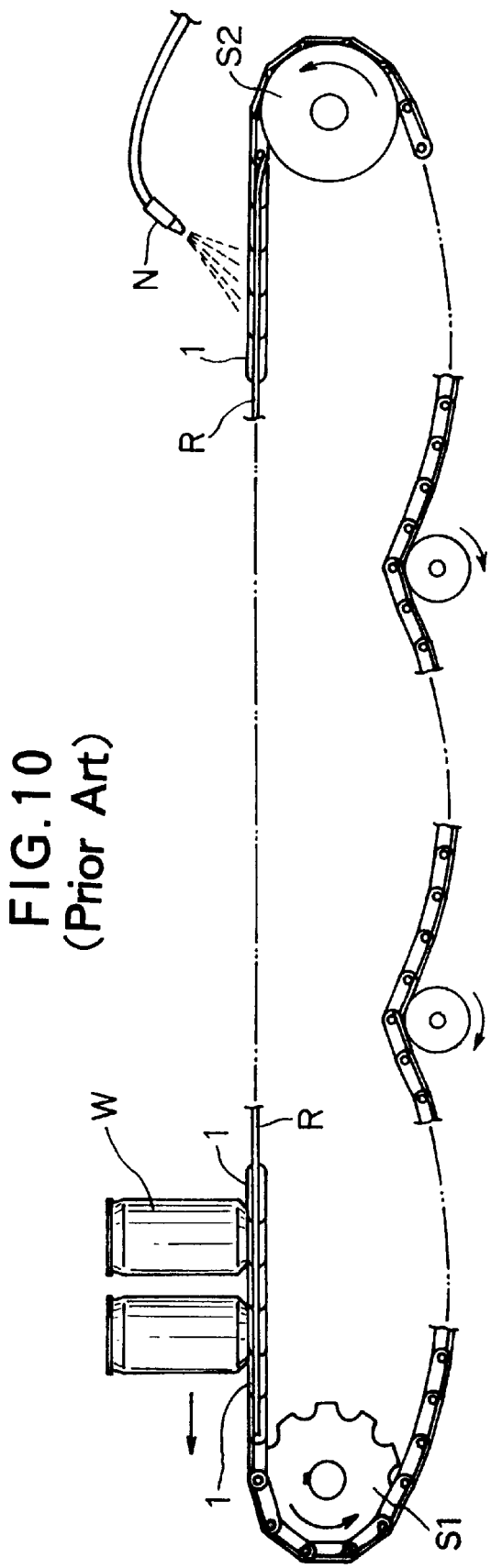
FIG. 10 is a diagrammatical view of the conventional slat conveyor chain as it is driven to transport the cans while a lubricating liquid is showered onto a load-bearing upper surface of the slat conveyor chain.

FIG. 6 shows the underside of part of a slat conveyor chain 70 according to another embodiment of the present invention. The slat conveyor chain 70 is substantially the same in construction as the slat conveyor chain 60 of the foregoing embodiment shown in FIG. 5 with the exception that discharge grooves 12' formed in each sliding surface portion 13 of one slat 11' extend obliquely from the vicinity of an outer side edge of the slat 11' toward a longitudinal centerline of the slat conveyor chain 70 (on which the link 20 is located) in a direction opposite to the direction of chain travel indicated by the profiled arrow shown in FIG. 6. In other words, the discharge grooves 12' extend at an angle to the longitudinal centerline of the slat conveyor chain 70 such that they converge in the opposite direction to the chain travel. Each of the discharge grooves 12' is connected to a plurality of drain holes 11 arranged in a row extending obliquely to the longitudinal centerline of the slat conveyor chain 70.

In operation of the slat conveyor chain 70, the lubricating liquid supplied onto an upper surface of the slat conveyor chain 70 is introduced into the drain holes 11 and subsequently discharged from the discharge grooves 12' in a direction opposite to the direction of chain travel. In this instance, since the discharge grooves 12' are converging toward the longitudinal centerline of the slat conveyor chain 70, the lubricating liquid is positively guided toward a central portion of each slat 10' and thus can be used for lubricating a joint portion between each pair of adjacent links 20, 20. With this centralized discharging of the treatment liquid, it becomes possible to recover the lubricating liquid through a filtering unit and then use the recovered lubricating liquid again through a recirculating passage. This may achieve considerable saving of resources and energy used in the production line.

FIG. 7 shows a modification according to the present invention. This modification can be incorporated in the slats 10, 10' described previously with reference to FIGS. 5 and 6, respectively. As shown in FIG. 7, the sliding surface portions 13 (one being shown) of the slat 10 (10') are spaced from the corresponding guide rails R by a distance C at both leading and trailing end portions 14, 15 of the slat 10 (10'). The distance C is preferably at least equal to the depth of the discharge grooves 12. The leading end portion 14 of each slat 10 (10'), as shown in FIGS. 5 and 6, has a recessed profile complemental to a recessed profile of the trailing end portion 15 of an adjacent slat 10 (10'), so that when two adjacent slats 10 (10') are joined together by the pin 30, the recessed trailing end portion 14 of one slat 10 (10') is interdigitated with the recessed leading end portion 15 of the other slat 10 (10').

Because the sliding surface portions 13 of each slat 10 (10') are spaced from the guide rails R by the distance C at the leading and trailing end portions 14, 15 of the slat 10 (19'), when the slat conveyor chain 60 (70) is traveling along the guide rails R (FIG. 7) while a lubricating liquid is supplied from the nozzle N (FIG. 1) onto the upper surface of the slat conveyor chain 60 (70), an excess amount of lubricating liquid discharged from the discharge grooves 12 in one slat 10 (10') is smoothly delivered into the discharge groove 12 in a subsequent slat 10 (10') without spouting over the upper surface of the subsequent slat 10 through a joint clearance between the two adjacent slats 10 (10'). With this smooth delivery of the lubricating liquid, the frictional resistance between the sliding surface portions 13 of the slats 10 (10') and the guide rails R is considerably decreased and thus insures smooth traveling of the slat conveyor chain.

Obviously, various minor changes and modifications of the present invention are possible in the light of the above teaching. It is therefore to be understood that within the scope of the appended claims the present invention may be practiced otherwise than as specifically described.

What is claimed is:

1. A slat conveyor chain for a slat conveyor including a sprocket for driving said slat conveyor chain to travel in a direction along a guide rail of the slat conveyor for conveyance of articles while a treatment liquid is supplied onto an upper surface of the slat conveyor chain, said slat conveyor chain comprising:

a series of slats each having a multiplicity of drain holes extending from an upper surface to an underside of each slat for the passage therethrough of the treatment liquid, said drain holes being distributed in a desired pattern;

a series of links formed integrally with the respective undersides of said slats and articulately connected together by pins to form a flexible endless chain driven by the sprocket; and said underside of said slats each having a sliding surface portion facing said guide rail, and at least one discharge groove formed in said sliding surface portion and connected to at least one of said drain holes for discharging the treatment liquid passing from the upper surface of each said slat through said at least one drain hole.

2. A slat conveyor chain according to claim 1, wherein said drain holes each have a flared end opening at said upper surface of each slat for smoothly introducing the treatment liquid into said drain holes.

3. A slat conveyor chain according to claim 1, wherein said discharge groove extends in a direction parallel to the direction of travel of said slat conveyor chain.

4. A slat conveyor chain according to claim 3, wherein said pattern of said drain holes is such that a plurality of drain holes arranged in a row extending in a direction parallel to the direction of travel of said slat conveyor chain are all connected to said discharge groove.

5. A slat conveyor chain according to claim 1, wherein said discharge groove extends obliquely from the vicinity of an outer side edge of each slat to the associated link in a direction opposite to the direction of travel of said slat conveyor chain.

6. A slat conveyor chain according to claim 5, wherein said pattern of said drain holes is such that a plurality of drain holes arranged in a row extending obliquely to the direction of travel of said slat conveyor chain are all connected to said discharge groove.

7. A slat conveyor chain according to claim 1, wherein said slats each have a leading end portion and a trailing end portion located rearward of said leading end portion when viewed from the direction of travel of said slat conveyor chain, and said sliding surface portion of each slat is partly spaced by a distance from the guide rail at said leading end portion and said trailing end portion of each said slat so as to enable smooth delivery of the treatment liquid from said discharge groove in one slat to said discharge groove in a subsequent slat.

* * * * *